United States Patent [19]

Inoue

[11] 4,394,558
[45] Jul. 19, 1983

[54] EDM METHOD OF MACHINING WORKPIECES WITH A CONTROLLED CRATER CONFIGURATION

[75] Inventor: Kiyoshi Inoue, Tokyo, Japan

[73] Assignee: Inoue-Japax Research Incorporated, Yokohama, Japan

[21] Appl. No.: 253,287

[22] Filed: Apr. 13, 1981

[30] Foreign Application Priority Data

Apr. 15, 1980 [JP] Japan .................................. 55-49662
Apr. 15, 1980 [JP] Japan .................................. 55-49663

[51] Int. Cl.$^3$ .............................................. B23P 1/12
[52] U.S. Cl. ............................ 219/69 W; 219/69 M; 219/69 D; 219/69 V
[58] Field of Search ............... 219/69 V, 69 M, 69 D, 219/69 R, 68, 69 P; 204/129.1, 129.6, 129.7

[56] References Cited

U.S. PATENT DOCUMENTS 3,699,303 10/1972 Kauffman et al. ............... 219/69 D
4,205,213 5/1980 Inoue .................................. 219/69 M
4,247,749 1/1981 Wavre ............................ 219/69 V Primary Examiner—M. H. Paschall
Attorney, Agent, or Firm—Karl F. Ross; Herbert Dubno

[57] ABSTRACT

An EDM method wherein the surface roughness of the machined workpiece is reduced or the ratio of the removal rate to the surface roughness is increased by controlling at least one of the rate of flow of the liquid machining medium through the discharge gap and the rate of relative displacement between the tool electrode and the workpiece along the machining interface so that each individual discharge crater on the workpiece surface becomes elliptical in shape and has its major axis at least two times greater than its minor axis.

8 Claims, 9 Drawing Figures

(a)

(b)

(a)

(b)

(a)

(b)

EDM METHOD OF MACHINING WORKPIECES WITH A CONTROLLED CRATER CONFIGURATION

FIELD OF THE INVENTION

The present invention relates in general to electrical discharge machining (EDM) and, in particular, to a novel and useful method of machining an electrically conductive workpiece by passing a series of discrete, localized and time-spaced electrical discharge pulses across a machining gap between a tool electrode and the workpiece flushed with a liquid machining medium.

BACKGROUND OF THE INVENTION

In electrical discharge machining, hereinafter referred to as EDM, conductive workpieces are machined by passing electroerosive power pulses between a workpiece electrode and a tool electrode spacedly juxtaposed therewith across an interelectrode gap flooded with a liquid machining medium which is at least in part of dielectric nature and which also serves to carry away the detritus or gap products of the electrical discharge machining process.

In a variety of EDM operations in which a conductive workpiece is drilled, shaped or cavity-sunk with a shaped tool electrode or contour-cut with a continuous, thin wire or like elongate tool electrode, a discrete electrical power pulse of a duration generally in the range between $10^{-7}$ and $10^{-2}$ seconds may be applied across a relatively carefully dimensioned machining gap with a gap size, for example, of 0.05 to 0.005 mm, and filled with the liquid machining medium to initially produce a dielectric breakdown of the gap medium across the distance of the lowest dielectric strength, that is generally the smallest distance, between a point on the tool electrode surface and a point on the workpiece electrode surface. The dielectric breakdown results in a spark discharge or a discharge of short arc type whereby a highly concentrated discharge current flows through the breakdown path between these electrode points. The applied electrical energy is highly concentrated (generally exceeding $10^5$ watts/cm$^2$ with a current density of $10^4$ to $10^9$ amp/cm$^2$) and is localized within a narrow discharge column so formed. A rapid temperature rise in the discharge column brings the metal in the region of the discharge spot on the workpiece electrode surface into molten and evaporated states. At the same time a rapid expansion of the metallic gases and liquid-decomposed gases in the discharge column brings about an intense pressure (estimated to amount to 100 to 500 Kg/cm$^2$) which effectively serves to impulsively pulverize the molten metal into fine particulate forms and scatter the particles away from the discharge spot. As a result, a crater-like formation comprising a crater recess and a surrounding crater mound is formed on the portion of the workpiece surface on which the discharge impinges. The next time-spaced pulse may then seek another pair of points on the tool and workpiece electrode surfaces and bridge across them a further high-energy electroerosive discharge. Thus, a succession of time-spaced and discrete power pulses applied across the opposed electrode surfaces provide randomly localized material removal discharges which produce cumulatively overlapping craters in the workpiece surface; the total surface is thus machined uniformly over the parts thereof confronting the tool electrode and the machined portion receives a configuration, e.g. a cavity or groove, conforming to the shape of the tool electrode.

The latter may be formed with the desired configuration of the cavity or the shape complementarily desired in the workpiece. Alternatively or in addition, the tool electrode is displaced relative to the workpiece electrode to form a desired electroerosively formed contour in the latter. During the machining operation, small metal or conductive chips or particles and other gap products (i.e. tar and gases) are carried away from the gap by the liquid machining medium which floods the gap and is generally circulated therethrough, while the tool electrode may be advanced relative to the workpiece by a servo mechanism designed to maintain a predetermined gap spacing or designed to approach the desired gap spacing as accurately as possible.

Each individual EDM crater is generally circular in shape as diagrammatically depicted in FIG. 1(a) as seen from above. The crater has the region of a crater recess A surrounded by an annular crater mound B as seen from its side elevation or sectional view shown in FIG. 1(b). The crater recess A is shown to have a depth H and a diameter Dx and the crater mound B to have a height h. It can be seen that the size of the crater is related to the amount of stock removal per discharge and hence influences both the surface roughness and removal rate of an EDM process. On the other hand, it is known that the energy of each single discharge determines the size of the resulting crater. Thus, the greater the single discharge energy, the greater becomes the stock removal and hence the removal rate but at the same time the greater becomes the surface roughness. In other words, while it is desired to use a greater energy of single discharge to achieve a greater removal rate, it has been recognized that this can be done only at a sacrifice because of a greater surface roughness that unavoidably ensues. The stock removal W per single discharge and the EDM surface roughness Rmax which results cumulative of such single discharges have been found to be correlated as follows:

$$R\mathrm{max}^3 \alpha W \tag{1}$$

Hence, the fact that efforts to obtain a higher removal rate and efforts to obtain a finer surface roughness (finish) are mutually incompatible has plagued the art. One has to be satisfied with a relatively poor surface finish when a high removal rate is desired or with a relatively low removal rate when a fine finish is desired.

OBJECTS OF THE INVENTION

It is the principal object of the present invention to provide a novel EDM method which affords an increased machining efficiency, i.e. a finer surface finish for a given removal rate or a higher removal rate for a given surface finish.

Another object of the invention is to provide a novel EDM method which affords a greater stock removal and finer surface finish for a given machining power.

A further object of the invention is to provide a relatively simple and inexpensive EDM apparatus adapted to execute the novel method described.

Other objects will become apparent as the following description proceeds.

SUMMARY OF THE INVENTION

These objects are attained, in accordance with the present invention, by a method of machining an electrically conductive workpiece with a tool electrode juxtaposed therewith across a machining gap flooded with a liquid machining medium wherein a succession of time-spaced electrical pulses are passed through the machining gap to produce between the opposed surfaces of the tool electrode and the workpiece, discrete electroerosive discharges each of which results in the formation of a discharge crater on a localized spot on the workpiece surface and the consequential localized stock removal therefrom and which, with such discharge craters formed successively and randomly throughout the workpiece surface opposed to the tool electrode surface, cumulatively remove stock from the workpiece while the tool electrode is moved relative to the workpiece along a predetermined path to advance stock removal in the workpiece, wherein the liquid machining medium may be forced to flow through said machining gap; and wherein the tool electrode may be displaced relative to the workpiece, independently of the aforesaid relative movement therebetween, which method further comprises: reducing the surface roughness of the machined workpiece by controlling the rate of the said flow of the liquid machining medium through the gap and/or the rate of the said relative displacement between the tool electrode and the workpiece so that each of said discharge craters becomes elliptical in shape and has its major axis at least two times greater than its minor axis.

It has now been found that in this manner it is possible to use a given amount of discharge energy per single pulse to yield a crater with a reduced value of (H+h) and a greater value of Dx and to obtain a greater stock removal W and a reduced surface roughness Rmax. Specifically, in this manner it has been found that the relationship between the stock removal W (per single discharge) and the surface roughness Rmax (cumulative of repeated discharges) is given by an altered expression:

$$R\text{max}^{1.5} \sim 2\alpha W \qquad (2)$$

Thus, the invention resides in controlling at least one of the rate of flow of the liquid machining medium through the gap and the rate of relative displacement between the tool electrode and the workpiece to gain results which have never been expected heretofore. When, for example, the rate of gap flow of the liquid machining medium or the rate of relative electrode displacement exceeds a certain level, each individual discharge crater becomes, surprisingly, elliptical in shape, as shown in FIGS. 2 and 3, having its major axis Dr extending in the direction of the flow of the liquid machining medium or the relative electrode displacement. It has further been found that, when the crater is deformed into an elliptical shape to the extent that its major axis Dr is more than twice greater than its minor axis Dx, the deformed crater has an appreciably reduced sum of the depth of crater recess and the height of crater mount (H+h) and yet has a greater volume of the crater recess (at least twice greater) than the conventional undeformed crater for a given amount of the applied discharge energy. Since a greater stock removal with a reduced value of (H+h) is achieved for a given amount of the applied discharge energy, it follows that an improvement both in removal rate and surface roughness results, hence an increase in the ratio of removal rate to surface roughness.

BRIEF DESCRIPTION OF THE DRAWING

These and other objects, features and advantages of the present invention will become more readily apparent from the following description of certain embodiments thereof as taken with reference to the accompanying drawing in which.

SPECIFIC DESCRIPTION

Figure 4:
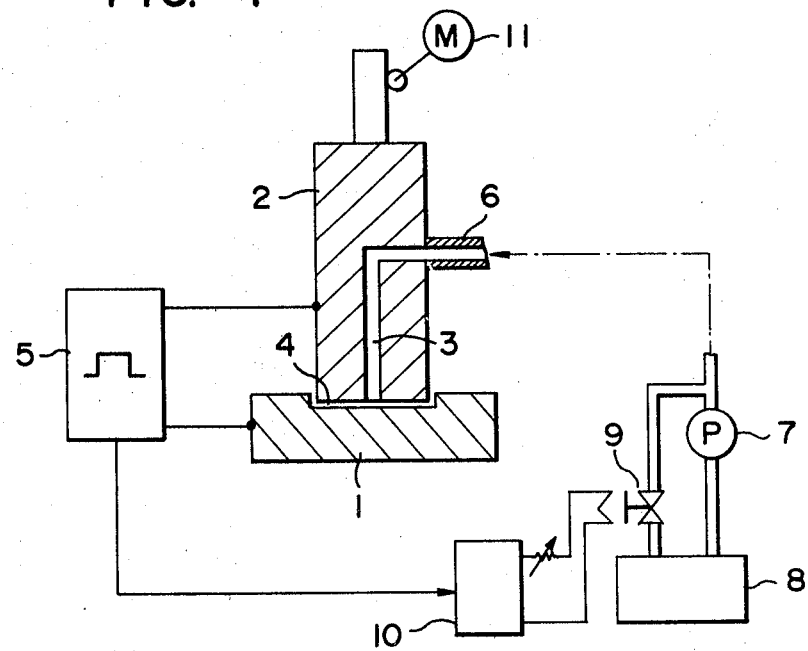
FIG. 4 is a schematic view, partly in section, diagrammatically illustrating an embodiment of the invention in which the rate of flow of the liquid machining medium is controlled.

Referring first to FIG. 4, a workpiece 1 is shown to be juxtaposed with a tool electrode 2 in a conventional sinking-type EDM arrangement. The tool electrode 2 has a fluid passage 3 therein which is open to an EDM gap 4 defined between the tool electrode 2 and the workpiece 1 in the region of a cavity being formed in the latter. An EDM power supply 5 is connected to the tool electrode 2 and the workpiece 1 to apply therebetween a succession of EDM electroerosive pulses and has various settings for the on-time (pulse duration) and off-time (pulse interval) as well as the peak current of these pulses. The fluid passage 3 formed through the tool electrode 2 has an inlet duct 6 fed with a liquid machining medium delivered under an elevated pressure by a pump 7 from a reservoir 8. A relief valve 9 returns a portion of the liquid machining medium drawn by the pump 7 from the reservoir 8 to the latter and is an electromagnetic valve regulated by a control circuit 10 to control the delivery pressure of the liquid machining medium into the machining gap 4 and thereby control its rate of flow through the latter for the purposes of the invention. The control circuit 10 has valve control settings ganged with settings in the EDM power supply 5 for EDM power parameters and, in particular, the peak current Ip and the on-time τon of electroerosive pulses which determine the energy level consumed by each electroerosive discharge pulse so that when a particular EDM power setting is selected in the power supply 5, the corresponding preselected valve control setting is actuated in the control circuit 10 to provide the corresponding preselected high rate of flow of the liquid machining medium through the EDM gap in accordance with the principles of the present invention. As the EDM process proceeds, a feed drive motor 11 advances the tool electrode 2 into the workpiece 1 while maintaining the spacing of the gap 4 therebetween substantially constant until the cavity of a desired depth is achieved.

To allow the liquid machining medium to flow through the machining gap 4 at a sufficiently high rate, it is desirable to place the tool electrode 2 and the workpiece 1 in the atmosphere (rather than to immerse them in the liquid medium) and at the same time to use a liquid machining medium having a low viscosity. The medium open to the air in the gap region should also be free from inflammability and should when discharge-decomposed not emit hazardous gases. A highly suitable EDM liquid machining medium which meets these requirements is water deionized by an ion-exchanger to possess a specific resistivity in the range between $10^3$ and $10^5$ ohm-cm.

Figure 1:
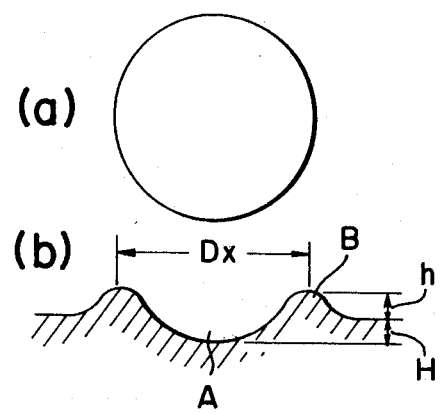
FIGS. 1(a) and 1(b) are plan and elevational sectional views, respectively, diagrammatically illustrating a conventional circular discharge crater formed with a given amount of the applied discharge energy.
Figure 2:
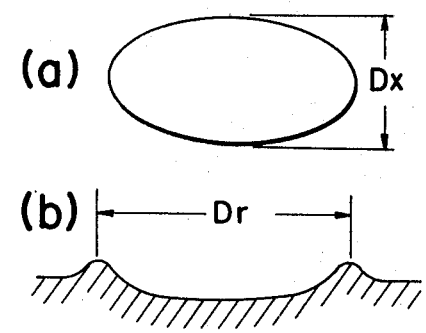
FIGS. 2(a) and 2(b) are plan and elevational sectional views, respectively, diagrammatically illustrating an elliptical discharge crater formed according to the invention with the same amount of the applied discharge energy, the elliptical crater having its major axis approximately twice greater than its minor axis.
Figure 3:
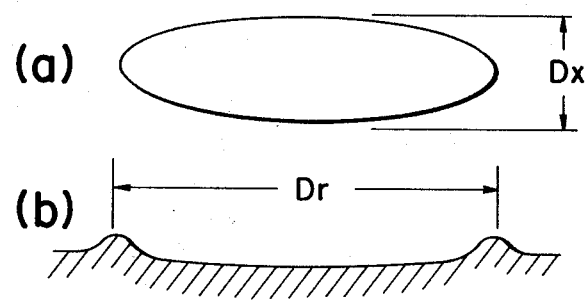
FIGS. 3(a) and 3(b) are similar diagrammatic views of an elliptical discharge crater according to the invention having its major axis much greater than its minor axis.

FIGS. 2 and 3 show discharge craters deformed to be elliptical and elongated to varying extents in the direction of the high-rate flow of the liquid machining medium. Given a discharge peak current Ip, a desired discharge crater of elliptical shape with its major axis Dr at least two times greater than its minor axis Dx and consequentially a desired reduced surface roughness is obtained by controlling the increase in the rate of flow of the liquid machining medium through the machining gap correspondingly in conjunction with particular values of the pulse on-time or duration $\tau$on employed which determines the discharge fusion time.

EXAMPLE I

A ferrous workpiece is machined with a copper tool electrode using a liquid machining medium constituted by a distilled water liquid having a specific resistivity of $10^4$ ohm-cm. A succession of EDM pulses have a peak current Ip of 27 amperes and on-time $\tau$on of various values. In the Table 1 below, A shows surface roughnesses obtained in the conventional manner using the liquid machining medium flowing at a low rate of 5 m/sec invariably or regardless of varying on-times $\tau$on and B shows surface roughnesses obtained according to the invention using the same machining medium flowing at high rates varied in conjunction with the varying on-times $\tau$on.

TABLE 1

| A (Conventional) | | | B (Invention) | | |
|---|---|---|---|---|---|
| $\tau$on ($\mu$sec) | Flow Rate (m/s) | Surface Roughness ($\mu$Rmax) | $\tau$on ($\mu$sec) | Flow Rate (m/sec) | Surface Roughness ($\mu$Rmax) |
| 50 | 5 | 25 | 50 | 10 | 12 |
| 10 | 5 | 15 | 10 | 20 | 8 |
| 1 | 5 | 8 | 1 | 80 | 5 |
| 0.5 | 5 | 5 | 0.5 | 180 | 3 |

It is seen that the machining medium should be flowing at an increased rate in accordance with the invention and yet at a greater rate 4 in a finer finish range requiring shorter pulses than in a rougher machining range requiring wider pulses to achieve desired elliptical discharge craters and consequentially to obtain reduced surface roughnesses or improved surface finishes. In this manner, the surface roughness according to the invention is reduced, in each machining range, to approximately or even less than one half the surface roughness attainable conventionally.

EXAMPLE II

In Example I, the rate of flow of the water machining medium is varied from 0 to 25 m/sec for the machining range using an on-time $\tau$on of 10 $\mu$sec and the removal rate and the surface roughness are measured.

Figure 5:
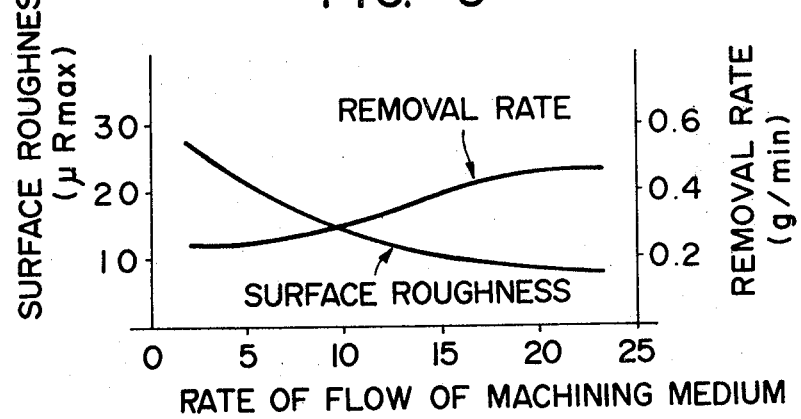
FIG. 5 is a graph representing relationships between the rate of flow of the liquid machining medium and the removal rate, and the surface finish.

FIG. 5 shows a graph in which the rate of flow (m/sec) varied is plotted along the abscissa and the surface roughness measured in $\mu$Rmax is plotted along the ordinate on the left hand side while the removal rate measured in gram/min is plotted along the ordinate on the right hand side. It is seen that the removal rate with the flow rate of 20 m/sec is about twice greater than with the flow rate of 5 m/sec whereas the surface roughness is reduced to about one half as already noted. The correlation between the amount of stock removed per single discharge and the surface roughness with a flow rate in excess of 15 to 20 m/sec has verified the aforementioned expression (2).

It has been shown to be necessary to use an extremely high rate of flow of the liquid machining medium especially in finish and ultra-finish ranges. To facilitate such an increased rate of flow, it has to be found to be advantageous to impart high-frequency sonic or ultrasonic vibration to the tool electrode 2. To this end, an electromechanical transducer energized by a high-frequency power supply may be attached via a conventional horn body to the tool electrode 2. By imparting mechanical vibrations of a frequency of 1 kHz to 10 MHz to the tool electrode 2, the machining gap is effectively enlarged by the amplitude of the vibrations practically without causing adverse influence on the machining action which continues therein. The vibrations effectively bring about an enhanced pumping action in the gap for the liquid machining medium which is thus permitted to flow through the narrow gap spacing at an increased rate of flow under a reduced delivery pressure. For example, with vibrations of a frequency of 1.6 MHz imparted to the tool electrode, the delivery pressure can be reduced to one half of that required when no vibration is imparted, to yield a given machining result at an increased removal rate.

It will be apparent that the embodiment of the invention described is applicable to practically any form of the EDM process using any form of the tool electrode. Thus, the tool may, instead of a block form as shown, be a wire, rod or pipe. The continuous wire electrode may be used in a conventional wire-cutting EDM arrangement. The tool electrode may also be in the form of a rotary disk or pipe. The liquid machining medium may, instead of being supplied through the electrode, be furnished through one or more nozzles disposed in the proximity of the machining gap.

Figure 6:
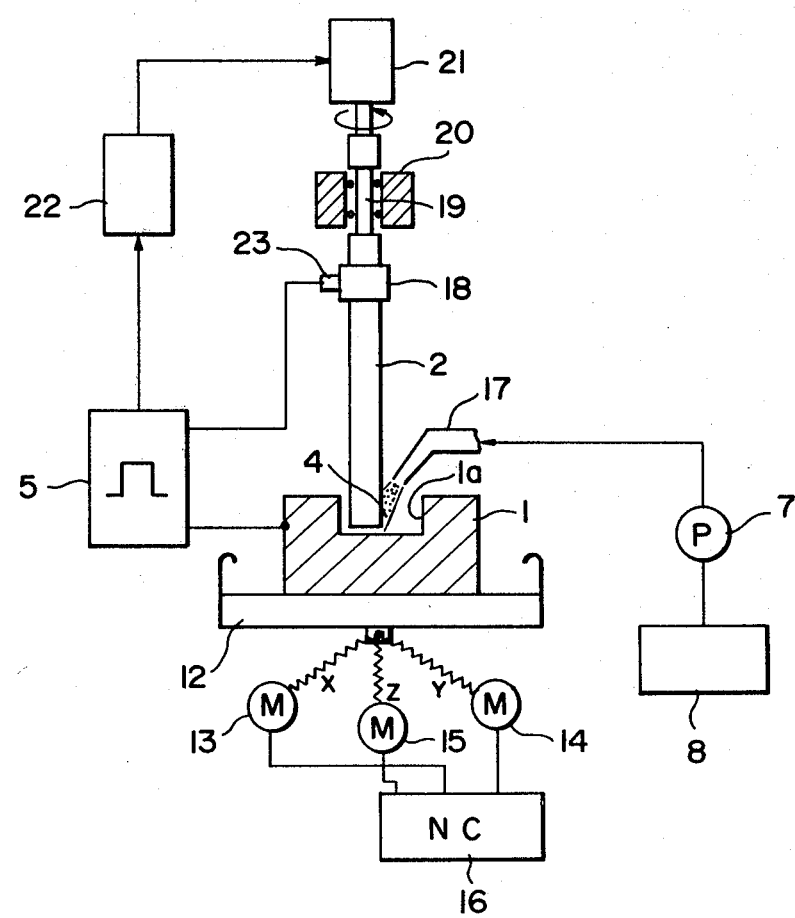
FIG. 6 is a schematic view, partly in section, diagrammatically illustrating another embodiment of the invention in which the rate of relative displacement between the tool electrode and the workpiece is controlled.

The embodiment of the invention shown in FIG. 6 is designed to create discharge craters of an elliptical shape and consequentially achieve an improved surface finish (reduced surface roughness) or an increased ratio of removal rate to surface roughness by employing a controlled relative displacement between the tool electrode 2 and the workpiece 1, alternatively or in addition to a controlled rate of flow of the liquid machining medium as already described.

This embodiment is shown in FIG. 6 practiced with an EDM arrangement in which a cavity 1a is machined in the workpiece 1 with a shape generally independent of the shape of the tool electrode 2 and the workpiece 1 which is securely held in a work vessel 12. The latter is driven by three independent motors 13, 14 and 15 operated by drive signals furnished from a numerical controller 16. The motor 13 is adapted to move the vessel 12 along an x-axis, the motor 14 to move the vessel 12 along a y-axis orthogonal to the x-axis and the motor 15 to move the vessel 12 along a z-axis orthogonal to both the x-axis and the y-axis. The numerical controller 16 has preprogrammed movement data corresponding to a series of movement paths to be followed by the workpiece 1 relative to the tool electrode 2 to obtain a desired contour of the cavity 1a in the workpiece 1. In operation of the system, the liquid machining medium is supplied by the pump 7 from the reservoir 8 through a nozzle 17 into the machining gap 4 and the EDM power supply 5 is actuated to provide a succession of electroerosive discharge pulses between the workpiece 1 and the tool electrode 2 juxtaposed therewith across the gap 4. The preprogrammed data in the numerical controller 16 are reproduced and converted therein into drive pulses which are applied to the X, Y and Z axis motors 13, 14 and 15 to move the workpiece 1 relative to the tool electrode 2 along predetermined three-dimensional paths, thereby forming the electroerosively-machined cavity 1a in the workpiece 1. As mentioned previously, the liquid machining medium is preferably a deionized water liquid having a specific resistivity of $10^3$ to $10^5$ ohm-cm.

The means for effecting a controlled relative displacement between the tool electrode 2 and the workpiece 1 independently of the relative movement as mentioned for advancing the machining of the workpiece 1 here includes means for rotating the tool electrode 2 at an extremely high and yet controlled rate of rotation. The tool electrode 2 is thus shown secured with a chuck 18 to a rotary shaft 19 journaled by a bearing 20 and rotated by a motor 21 which is in turn driven by a control circuit 22. The chuck 18 is electrically conductive and has a brush 23 urged in sliding contact therewith for conducting the machining current to the tool electrode 2 from the power supply 5. The control circuit 22 has control drive settings for the rotary speed of the motor ganged with settings in the EDM power supply 5 for EDM parameters and, in particular, the peak current Ip and the on-time $\tau$on of the electroerosive pulses which determine the energy level consumed by each electroerosive discharge pulse so that when a particular EDM power setting is selected in the power supply 5, the corresponding preselected drive control setting is actuated in the control circuit 22 to provide the corresponding preselected high rate of rotation of the motor 21 and hence of displacement of the tool electrode 2 in accordance with the principles of the present invention.

The extremely rapid displacement of the tool electrode 2 caused by the high-rate rotation thereof relative to the workpiece 1 causes deformation of each individual discharge crater into an elliptical shape, as shown in FIGS. 2 and 3, with its major axis Dr extending in the direction of the relative displacement. Given a discharge peak current Ip, a desired discharge crater of elliptical shape with its major axis Dr at least two times greater than its minor axis Dx and consequentially a desired reduced surface roughness (improved surface finish) or a desired increase in the ratio of the removal rate to the surface roughness is obtained by controlling the increase in the rate of rotation or displacement of the tool electrode 2 correspondingly in conjunction with particular values of the pulse on-time or duration $\tau$on employed which determines the discharge fusion time.

EXAMPLE III

A ferrous workpiece is machined with a cylindrical (columnar) copper tool electrode using a water machining liquid deionized to possess a specific resistivity of $10^4$ ohm-cm. A succession of EDM pulses have a peak current Ip of 27 amperes and on-time $\tau$on of various values. In Table 2 below, A shows surface roughnesses obtained in the conventional manner with no rotation of the tool electrode for varying on-times $\tau$on and B shows surface roughnesses obtained according to the invention while rotating the tool electrode at rates varied in conjunction with the varying on-times $\tau$on.

TABLE 2

| A (Conventional) | | B (Invention) | | |
|---|---|---|---|---|
| $\tau$on ($\mu$sec) | Surface roughness ($\mu$Rmax) | $\tau$on ($\mu$sec) | Rotation rate (rpm) | Surface roughness ($\mu$Rmax) |
| 50 | 25 | 50 | 600 | 12 |
| 10 | 15 | 10 | 1,200 | 8 |
| 1 | 8 | 1 | 5,000 | 5 |
| 0.5 | 5 | 0.5 | 10,000 | 3 |

It is seen that the tool electrode should be rotated at a greater rate in a finer finish range requiring shorter pulses than in a rougher machining range requiring wider pulses to achieve desired elliptical craters and consequentially to obtain reduced surface roughnesses or improved surface finishes. In this manner, the surface roughness according to the invention is reduced, in each machining range, to approximately or even less than one half the surface roughness attainable conventionally.

It should be understood that the relative displacement designed to produce discharge craters of an elliptical shape according to the invention is not limited to the rotation of the tool electrode as described. It is also possible, to this end, to impart small vibrations to the tool electrode in a direction transverse to the direction in which the tool electrode and the workpiece are opposed to one another.

There is thus provided a novel and useful EDM method which affords a reduced surface roughness and a marked increase in the ratio of removal rate to surface roughness.

What is claimed is:

1. A method of machining an electrically conductive workpiece with a tool electrode juxtaposed therewith across a machining gap flooded with a liquid machining medium,
    wherein a succession of time-spaced electrical pulses are passed through said gap to produce between the opposed surfaces of the tool electrode and the workpiece discrete electroerosive discharges each of which results in the formation of a discharge crater on a localized spot on the workpiece surface and the consequential localized stock removal therefrom and which, with such discharge craters formed successively and randomly throughout the workpiece surface opposed to the tool electrode surface, cumulatively remove stock from the workpiece while the tool electrode is moved relative to the workpiece along a predetermined path to advance stock removal in the workpiece;

wherein the liquid machining medium may be forced to flow through said machining gap; and wherein the tool electrode may be displaced relative to the workpiece, independently of but simultaneously with the aforesaid relative displacement therebetween, said method comprising: reducing the surface roughness of said machined workpiece by increasing at least one of the rate of said flow of the liquid machining medium through said gap and the rate of the second-mentioned relative displacement between the tool electrode and the workpiece to such an extent that each of said discharge craters becomes elliptical in shape and has its major axis at least two times greater than its minor axis.

2. The method defined in claim 1 wherein said liquid machining medium is a water liquid having a specific resistivity of $10^3$ to $10^5$ ohm-cm.

3. The method defined in claim 1 wherein the surface roughness is reduced by increasing said rate of flow of said liquid machining medium inversely as a function of the duration of said electroerosive discharge pulses.

4. The method defined in claim 1, claim 2 or claim 3, further comprising facilitating the increase in said rate of flow of said liquid machining medium by imparting small mechanical vibrations to said tool electrode.

5. The method defined in claim 4 wherein said mechanical vibrations are of a frequency between 1 kHz and 10 MHz.

6. The method defined in claim 1 wherein the surface roughness is reduced by increasing said rate of relative displacement between said tool electrode and said workpiece inversely as a function of the duration of said electroerosive discharge pulses.

7. The method defined in claim 1 or 6 wherein said relative displacement is effected by rotating said tool electrode.

8. The method defined in claim 1 or claim 6 wherein said relative displacement is effected by vibrating said tool electrode in a direction transverse to the direction in which said tool electrode and said workpiece are opposed to one another.

* * * * *